United States Patent
Bise et al.

(10) Patent No.: US 7,272,287 B2
(45) Date of Patent: Sep. 18, 2007

(54) OPTICAL FIBER FILTER FOR SUPPRESSION OF AMPLIFIED SPONTANEOUS EMISSION

(75) Inventors: Ryan Tyler Bise, Chatham, NJ (US); John Michael Fini, Jersey City, NJ (US); Man Fei Yan, Berkeley Heights, NJ (US)

(73) Assignee: Fitel USA Corp, Norcross, GA (US)

( * ) Notice: Subject to any disclaimer, the term of this patent is extended or adjusted under 35 U.S.C. 154(b) by 0 days.

(21) Appl. No.: 11/126,712

(22) Filed: May 11, 2005

(65) Prior Publication Data

US 2006/0257071 A1 Nov. 16, 2006

(51) Int. Cl.
- G02B 6/02 (2006.01)
- G02B 6/032 (2006.01)
- G02B 6/293 (2006.01)

(52) U.S. Cl. .................... 385/123; 385/125; 385/27
(58) Field of Classification Search ............... None
See application file for complete search history.

(56) References Cited

U.S. PATENT DOCUMENTS

| | | | |
|---|---|---|---|
| 4,515,436 A | 5/1985 | Howard et al. | |
| 4,531,811 A | 7/1985 | Hicks | |
| 5,717,799 A | 2/1998 | Robinson | |
| 5,857,053 A | 1/1999 | Kane | |
| 6,141,142 A | 10/2000 | Espindola et al. | |
| 6,192,179 B1 | 2/2001 | Berkey et al. | |
| 6,301,420 B1 | 10/2001 | Greenaway et al. | |
| 6,337,763 B1 | 1/2002 | Berkey et al. | |
| 6,429,963 B1 | 8/2002 | Berkey et al. | |
| 6,466,712 B1 | 10/2002 | Christodoulides et al. | |
| 6,563,995 B2 | 5/2003 | Keaton et al. | |
| 6,606,440 B2 * | 8/2003 | Hasegawa et al. | 385/125 |
| 6,608,952 B2 | 8/2003 | Eggleton et al. | |
| 6,711,334 B2 * | 3/2004 | Szkopek et al. | 385/127 |
| 6,813,416 B2 | 11/2004 | Pan | |

(Continued)

FOREIGN PATENT DOCUMENTS

EP 0 182 033 5/1986

(Continued)

OTHER PUBLICATIONS

L. Cohen, D. Marcuse, W. Mammel, "Radiating Leaky-Mode Losses in Single-Mode Light Guides with Depressed-Index Claddings", Oct. 1982, vol. 18, Issue: 10, pp. 1467-1472 Quantum Electronics, IEEE Journal of.

(Continued)

Primary Examiner—Rodney Bovernick
Assistant Examiner—Omar Rojas
(74) Attorney, Agent, or Firm—Wendy W. Koba

(57) ABSTRACT

An in-line, distributed optical fiber filter comprises a core region with a raised refractive index (with respect to the surrounding cladding material) so as to allow for total internal reflection (TIR) of the desired transmission wavelength(s). One or more raised index features are formed within the cladding region and are configured so as to result in mode mixing between the cladding mode and core mode at determined wavelength(s) to be removed by filtering. The parameters associated with determining the proper core specifications and cladding specifications can be separately determined to provide for enhanced performance in terms of both filtering unwanted signals and propagation of desired communication signals.

13 Claims, 4 Drawing Sheets

U.S. PATENT DOCUMENTS

| | | |
|---|---|---|
| 6,822,786 B2 | 11/2004 | Wu et al. |
| 6,844,962 B2 | 1/2005 | Arbore et al. |
| 6,859,585 B1 | 2/2005 | DeBarros et al. |
| 2002/0105720 A1 | 8/2002 | Minelly et al. |
| 2003/0035631 A1 | 2/2003 | Eggleton et al. |
| 2003/0169987 A1* | 9/2003 | Eggleton et al. ............ 385/125 |
| 2004/0233941 A1 | 11/2004 | Fajardo et al. |

FOREIGN PATENT DOCUMENTS

| | | |
|---|---|---|
| EP | 0 417 441 | 3/1991 |
| EP | 0 498 945 | 8/1992 |
| JP | 56 128904 A | 10/1981 |

OTHER PUBLICATIONS

RK Varshney and Arun Kumar, "Effect of Depressed Inner Cladding on the Polarization Characteristics of Elliptical-Core Fibers", Optics Letters, vol. 9, No. 11, Nov. 1984.

Mark A. Arbore, "Application of Fundamental-Mode Cutoff for Novel Amplifiers and Lasers", Lightwave Electronic Corporation.

S. Frurier, P. Viale, F. Gerome, P. Leproux, P. Roy, J.M. Blondy, B. Dussardier, G. Monnom, "Very Large Effective Area Singlemode Photonic Bandgap Fibre", Electronics Letters, Aug. 21, 2003, vol. 39, No. 17.

F. Brech E T, P. Leproux, P. Roy, J. Marcole, D. Pagnoux, "Analysis of Bandpass Filtering Behaviour of Singlemode Depressed-Core-Index Photonic-Bandgap Fibre" Electronics Letters, May 11, 2000, vol. 36, No. 10.

A.K. Abeeluck, N.M. Litchinitser, C. Headley, B.J. Eggleton, "Analysis of Spectral Characteristics of Photonic Bandgap Waveguides" Optics Express, Nov. 18, 2002, vol. 10, No. 23 pp. 1320-1333.

Liang Dong, George E. Berkey, Paul Chen, David L. Weidman, "Resonant Ring Fiber Filters" Journal of Lightwave Technology, vol. 18, No. 7, Jul. 2000.

Brechet, F. et al, "Analysis of Bandpass Filtering Behavior of Singlemode Depressed-Core-Index Photonic- Bandgap Fibre" Electronics Letters, IEEE Stevenage, GB vol. 36, No. 10, May 11, 2000, pp. 870-872.

* cited by examiner

OPTICAL FIBER FILTER FOR SUPPRESSION OF AMPLIFIED SPONTANEOUS EMISSION

TECHNICAL FIELD

The present invention relates to an all-fiber optical filter and, more particularly, to an all-fiber optical filter comprising selective arrangements of core and cladding material to provide for wavelength-selective filtering, helpful in reducing amplified spontaneous emission (ASE).

BACKGROUND OF THE INVENTION

Optical fiber systems are known to be sensitive to a variety of different sources of "optical noise" (extraneous signals at wavelengths other than the desired wavelength(s)) that result in impairing the system performance. Various types of filtering arrangements have been proposed through the years to address this problem. Discrete filtering elements (incorporating multiple thin film layers) have been used to remove selected wavelengths from propagating along the fiber. While such discrete filters may be able to reduce the accumulated noise power, they may not sufficiently reduce other system impairments, such as power lost due to noise amplification. Going forward, a distributed, in-line fiber filter is considered to be a more desirable solution than the use of discrete devices, especially for amplifier applications where splice losses, power lost to noise amplification, etc. can effect overall amplifier performance.

Bragg gratings may be formed within the core region of the transmission fiber as one such type of in-line fiber filter to "reflect" selected wavelengths and prevent further propagation of undesirable signal components. See, for example, U.S. Pat. No. 5,717,799 issued to A. Robinson on Feb. 10, 1998, describing the use of a Bragg grating, where the grating is particularly configured to be chirped and apodized to improve the filter qualities. While various in-line arrangements have been successful in providing some filtering, reflection gratings are problematic for in-line filtering in amplifiers, since reflections can lead to unwanted oscillations or lasing at the noise wavelengths. Reflecting gratings can be used as discrete filters, but then do not give the advantages of distributed filtering that are important to the present invention. U.S. Pat. No. 6,141,142 issued to R. P. Espindola et al. on Oct. 31, 2000 discusses an example of a fiber amplifier employing distributed filtering. In this case, filtering is provided by tilted ("blazed") gratings, instead of reflection Bragg gratings. While some distributed filter embodiments can provide effective filtering, this method requires additional processing steps in fiber fabrication, and restricts the dopant profile of the fiber to those with appropriate photosensitivity.

Thus, a need remains in the prior art for an arrangement that provides optical filtering with enhanced wavelength selectivity, preferably using an in-line, distributed, all-fiber arrangement that eliminates the need to include discrete devices in the optical communication system.

SUMMARY OF THE INVENTION

The need remaining in the prior art is addressed by the present invention, which relates to an all-fiber optical filter and, more particularly, to an all-fiber, distributed optical filter comprising selective arrangements of core and cladding material to provide for wavelength-selective filtering that reduces amplified spontaneous emission (ASE).

In accordance with the present invention, a core region of the transmission fiber is configured to have a "raised index" value (that is, the core region is formed to exhibit a refractive index greater than that of the adjacent clad region), while selected areas in the surrounding cladding area are configured to form "features" that also exhibit a raised refractive index (with respect to the majority of the remaining cladding material). The index of the core is raised to provide a difference in refractive index between the cladding and the core such that the selected (desired) wavelengths will remain confined within the core region. Additionally, by careful choice of the refractive index values and physical properties of the raised-index cladding features, selective wavelength filtering may be obtained. The unwanted (filtered) wavelengths will "leak" out of the core and then guided into the cladding, away from the propagating signal path.

It is an aspect of the present invention that the parameters of the core and the cladding may be individually tailored to provide the desired wavelength sensitivity (i.e., "decoupling" the core parameters from the cladding parameters). That is, the core diameter and index value may be determined to allow for optimum propagation of the desired wavelength(s). The cladding raised index features are separately defined, in terms of physical design, location, passband values, stopband values, etc. to provide the desired filtering properties.

The cladding raised index features may comprise any desired geometry, such as one or more rings, "holes", etc. and are formed using any preferred techniques associated with the formation of optical fiber preforms. In some cases, microstructured optical fibers may be used. Alternatively, MCVD techniques can be used to form one or more concentric "rings" of cladding material exhibiting a higher refractive index.

Other and further features, advantages and embodiments of the present invention will become apparent during the course of the following discussion and by reference to the accompanying drawings.

BRIEF DESCRIPTION OF THE DRAWINGS

Referring now to the drawings.

DETAILED DESCRIPTION

As mentioned above, there are a variety of different optical systems that can be improved, in terms of performance, by the application of wavelength-selective filtering to the signals propagating along the system optical fiber. In particular, "optical noise" can be reduced by selectively removing signals at certain wavelengths from propagating along the fiber. In accordance with the present invention, an all-fiber optical filter has been developed that exhibits separate cladding modes and core modes in the pass band(s) of interest, but exhibits only mixed core-cladding modes in the stop band(s). Mode mixing leads to reduced overall transmission via reduced gain and/or increased losses within the core region as a result of the signal coupling into the cladding region. An all-fiber filter formed in accordance with the present invention is based upon the following design principles: (1) a raised-index core region that guides light (propagating at desired wavelength(s)) primarily by total internal reflection (TIR), and (2) the inclusion of raised-index features in the cladding that are particularly configured to "guide" selected cladding modes. At wavelengths where the cladding modes are sufficiently index matched with a core mode, the modes will mix and light will "spill" into the cladding instead of being well-contained within the core. Once in the cladding, this light may be further lost from the system by radiation, absorption, or other processes. These wavelengths are thus defined as the stop band(s) of the filter design and can be controlled by manipulating various properties of the raised-index cladding features, such as (but not limited to) the selected refractive index value, the number of included features, the size of the individual features, placement of the features, etc.

The distributed, all-fiber filter of the present invention is considered to be particularly well-suited for fiber amplifier applications. In conventional fiber amplifiers, splice losses and power lost to noise amplification have been found to affect amplifier performance. By having the ability to selectively filter (reduce gain/increase loss) of signals propagating at known "noise" wavelengths, the overall amplifier performance will improve, as evidenced by lower total noise power, improved noise figure, or better power efficiency in converting pump power to desired signal power. One measure of good filter performance is a high extinction ratio— the ratio of loss at the noise wavelength to loss at the desired signal wavelength. Indeed, it is possible to provide a loss at a noise wavelength that is at least a factor of five greater than the loss at the desired signal wavelength (with a difference between the noise and signal wavelengths being less than 20%). The core-guided mode can experience large positive gain, or negative dispersion, for wavelengths near an index crossing point, with the dispersion controlled by proper design of the fiber.

Figure 1:
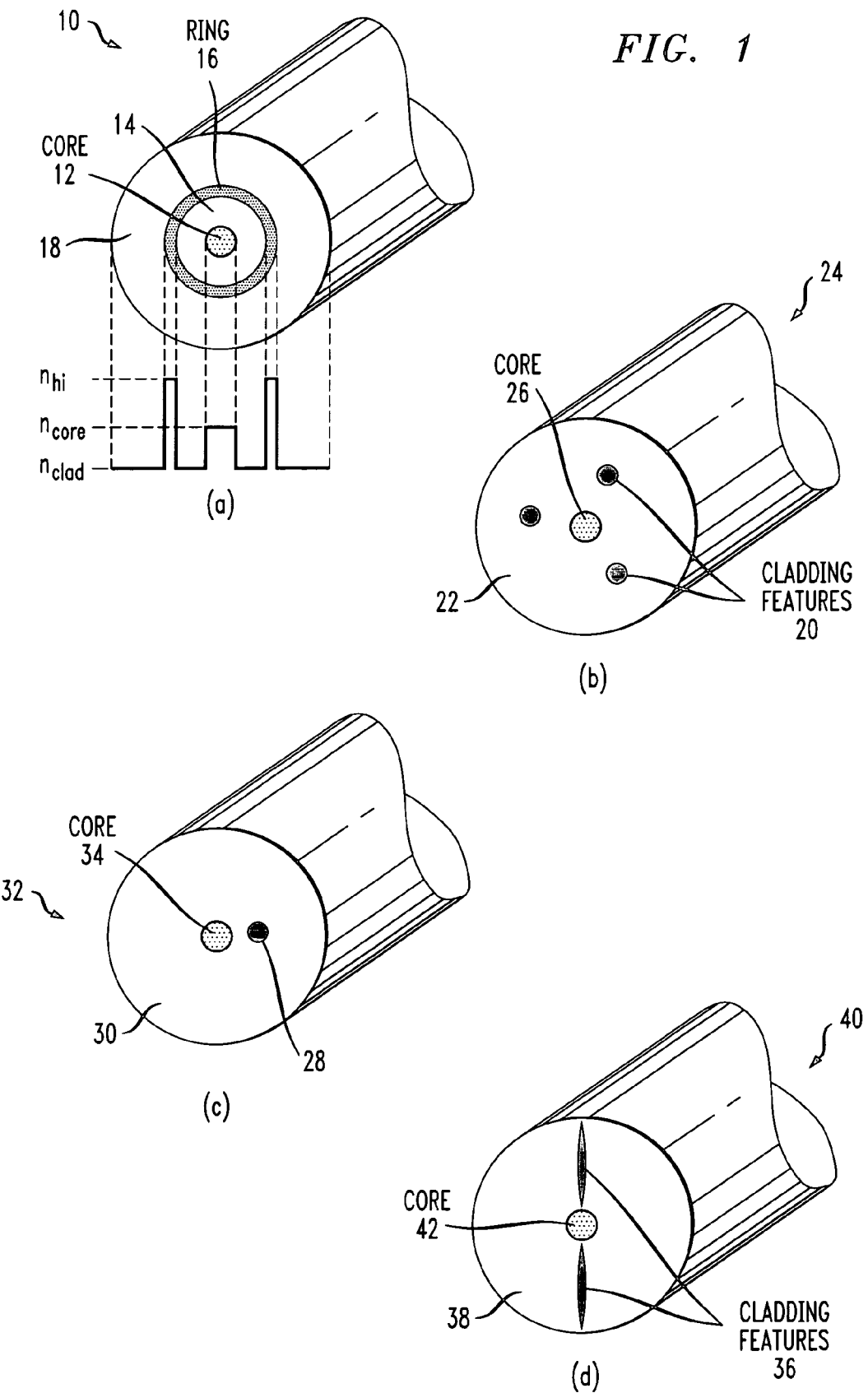
FIG. 1 contains cross-sectional view of various optical fiber filters formed in accordance with the present invention, with FIGS. 1(a)-1(d) illustrating a set of four particular embodiments.

FIGS. 1(a)-(d) contain cross-sectional illustrations of four exemplary configurations for providing wavelength-selective filtering in accordance with the present invention, where a graph of the refractive index profile is shown in association with the arrangement of FIG. 1(a) for the purposes of the present discussion. Referring to these embodiments, the arrangement of FIG. 1(a) illustrates an exemplary optical fiber 10 including a raised-index core region 12, surrounded by an inner cladding region 14. A raised-index cladding feature 16 (in this case, a ring) is illustrated as enclosing inner cladding region 14, with an outer cladding region 18 disposed around cladding ring 16. As particularly illustrated in the index profile of FIG. 1(a), core region 12 is illustrated as exhibiting a "raised" refractive index value, denoted $n_{core}$, with respect to the nominal refractive index of the surrounding cladding (denoted $n_{clad}$). As also shown, cladding ring 16 is formed as a raised-index feature with a relatively high refractive index value, denoted $n_{hi}$ in the index profile of FIG. 1(a). In one exemplary configuration of this embodiment of the present invention, $n_{core}-n_{clad} \approx 0.0016$ and $n_{hi}-n_{clad} \approx 0.026$.

FIG. 1(b) illustrates a different geometry, where a plurality of filled "holes" 20 are formed in a cladding region 22 of an optical fiber 24 including a central core region 26. As with the embodiment of FIG. 1(a), "holes" 20 of fiber 24 are filled with a relatively high refractive index material, sized and disposed with respect to core region 26 to achieve the desired filtering characteristics. As will be discussed in detail below, the particular refractive index of the fill material, diameter of the holes, their placement, etc. will define the wavelength(s) that will be removed by filtering in accordance with the present invention. A slightly different embodiment is illustrated in FIG. 1(c) where a single "hole" 28 is formed in a cladding region 30 of an optical fiber 32 including an optical core 34. In this embodiment, hole 28 behaves as a second "core", with refractive index, size and/or shape substantially different from the values associated with (primary) central core region 34. In this case, various selected wavelength(s) will be evanescently coupled into this "second core", providing the desired filtering along optical core region 34.

FIG. 1(d) illustrates a different embodiment, where a pair of longitudinally-extended cladding features 36 are formed within cladding region 38 of an optical fiber 40 including a core region 42. In this particular embodiment, polarization selectivity is also provided, where features 36 provide birefringence of the optical modes. It is to be understood that the exemplary arrangements as shown in FIGS. 1(a)-(d) are considered to be only illustrative of the filtering concept of the present invention, various other arrangements of cladding features, as well as feature size, placement, refractive index, etc. may all be varied in accordance with the present invention to provide the desired wavelength sensitivity.

Figure 2:
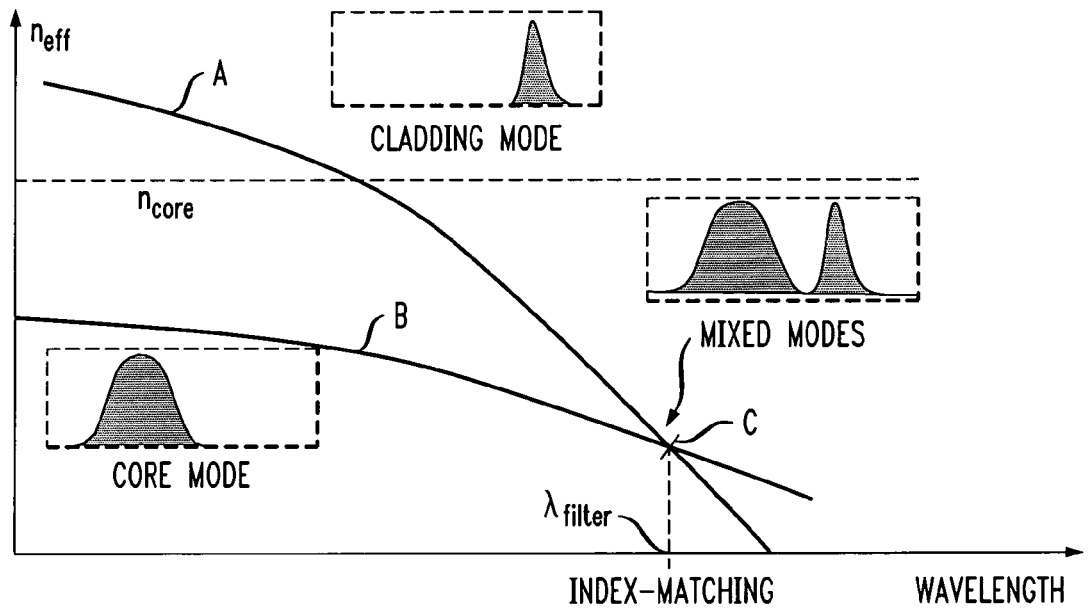
FIG. 2 is a graph of wavelength as a function of effective index, plotting both the core mode and cladding mode, and illustrating the index-matching condition where optical filtering will occur.

In accordance with the present invention, therefore, by careful design and choice of the cladding feature geometry, refractive index value, location, etc., the wavelengths that are removed by filtering can be "fine-tuned" to well-defined values. Indeed, it is possible to form a "notch" filter, with wavelengths on either side of a defined "noise" wavelength being allowed to propagate along the core of the fiber. When the effective index of the core mode comes close to the index of the cladding modes, index-matched mode mixing will occur, and light will spill out into the cladding, instead of being well-confined within the core. FIG. 2 contains a plot showing this mode mixing, illustrating the effective index ($n_{eff}$) as a function of wavelength. The cladding mode plot, labeled "A", is illustrated as a function of wavelength. The core mode plot is labeled "B", where as shown the two plots cross at the point of index matching, illustrated as point C in FIG. 2. The wavelength associated with this index matching, defined as $\lambda_{filter}$, is therefore the wavelength at which the signal will couple from the core to cladding, allowing this signal to be filtered out of the desired signals propagating along the core.

It is to be understood that the filtering properties associated with the selective inclusion of high-index material in the cladding of the inventive fiber can be further enhanced by using well-known techniques such as (but not limited to) mechanical deformations in the form of macrobending the fiber, microbending, twisting the fiber, incorporating gratings in the fiber, as well as the inclusion of absorptive or scattering materials in the fiber.

Figure 3:
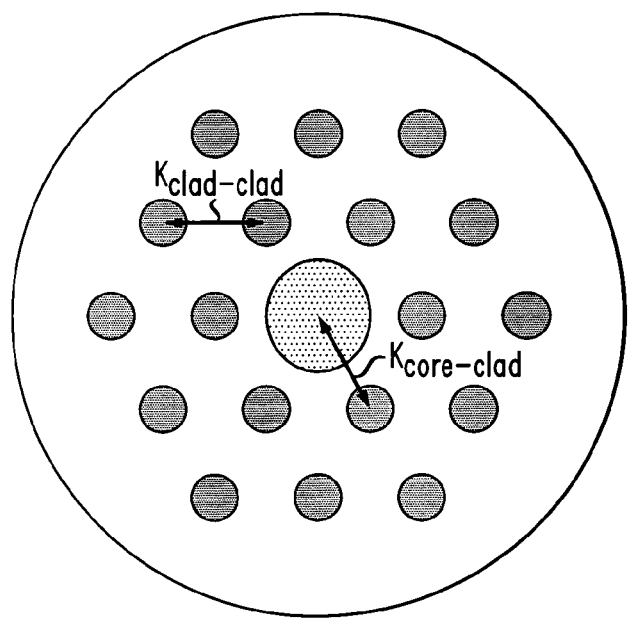
FIG. 3 is a cross-sectional view of yet another embodiment of the present invention, using a plurality of raised-index cladding features to provide the desired optical filtering.

FIG. 3 contains a cross-sectional view of yet another all-fiber optical filter 50 formed in accordance with the present invention. In this embodiment, optical filter 50 comprises a raised-index core region 52 surrounded by a relatively low index cladding region 54. The difference Δ between the refractive index of core 52 ($n_{core}$) and surrounding cladding 54 ($n_{clad}$) allows for the desired wavelengths to remain bounded within core region 52 through total internal reflection (TIR). In accordance with the present invention, a plurality of raised-index cladding features 56 are disposed throughout cladding region 54, where the various parameters of raised-index cladding features 56 are selected to provide the desired wavelength-selective filtering. In particular, the refractive index value of these features, in association with their size, number and placement will define the wavelength(s) removed (filtered) from the core region by out-coupling into the cladding. That is, the refractive index $n_{hi}$ and the diameter $d_{hi}$ of cladding features 56 will define the crossover/intersection between the cladding modes and core modes. This distance D between core region 52 and the nearest cladding feature 56 largely determines the core-clad coupling ($\kappa_{core-clad}$), which determines how closely the effective indices of the core and cladding modes need to match in order for substantial mixing between the modes to occur. The bandwidth of the filter, as well as the feature size of the filter spectrum, relate to the wavelength difference between a desired signal and the nearest noise components that can be filtered out. This feature size typically varies inversely with the coupling length $L_C$ and will decrease as the distance D increases. Preferred embodiments of the present invention will achieve sufficiently small feature sizes so as to be able to discriminate between noise and desired signals, while maintaining a coupling length $L_C$ sufficiently small to allow desirable filter properties. It has also been proposed that in order to maximize the power of the filtered signal coupled into the cladding there should be matching between the core-clad coupling ($\kappa_{core-clad}$) and the clad-clad coupling ($\kappa_{clad-clad}$), where these two values are illustrated in FIG. 3. When these two values become extremely different, reflections and coupling back into the core will occur, thus disturbing the filter properties.

Figure 4:
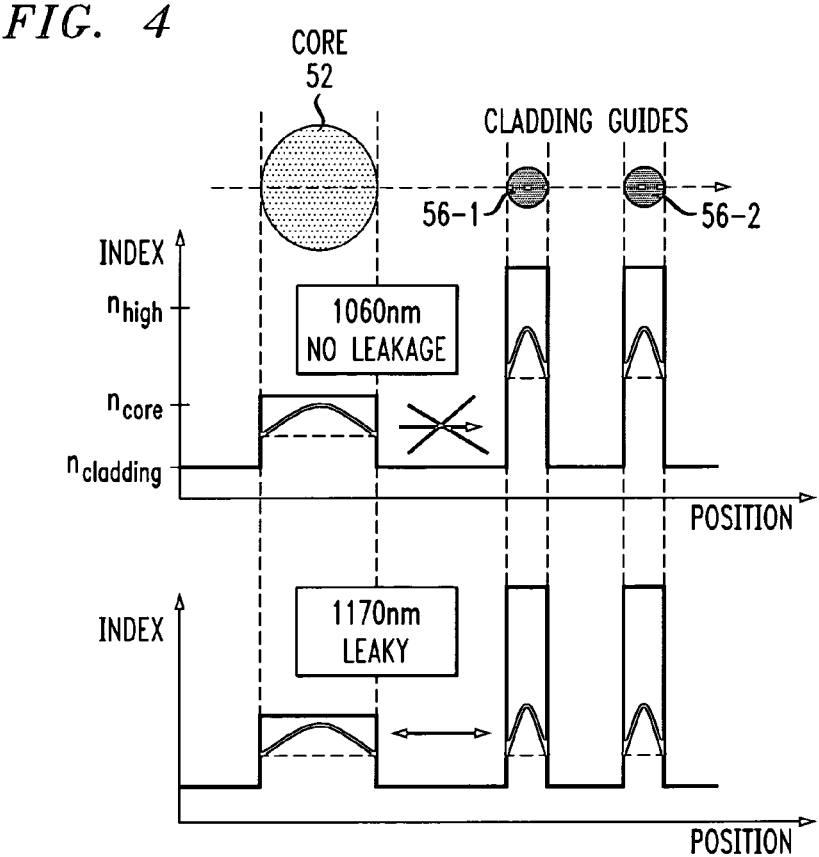
FIG. 4 contains schematic refractive index profiles for the fiber of FIG. 3, illustrating the condition where the modes remain separated (for the transmission wavelength), and where the modes match (for the filtered wavelength), with dotted horizontal lines indicating the mode effective index of light guided in the core and cladding regions.

FIG. 4 contains both designed and experimental refractive index profiles for filter 50, illustrating the properties of this specific arrangement for two different wavelengths: 1060 nm and 1170 nm. In an exemplary fiber amplifier embodiment, it is commonly desired to provide amplification and signal transmission at the wavelength of 1060 mm, while suppressing the noise signal present at the 1170 nm wavelength value. Also shown in FIG. 4 is core 52 and a pair of cladding features 56-1 and 56-2, where the refractive index profile is associated with this particular arrangement of features. In this case, there is little, if any, mode matching between the core-guided modes and the cladding modes for the desired transmission wavelength of 1060 nm. Therefore, essentially all of the signal will remain confined within core region 52, with little or no "leakage" into the cladding region. Conversely, for the wavelength of 1170 mm, it is desired to remove this signal component from propagating along core region 52. In this case, the modes are shown as matching between core region 52 and cladding features 56-1 and 56-2. Therefore, mode mixing will occur and the signal propagating at 1170 mm will be coupled into the cladding features and be guided away from core region 52.

Figure 5:
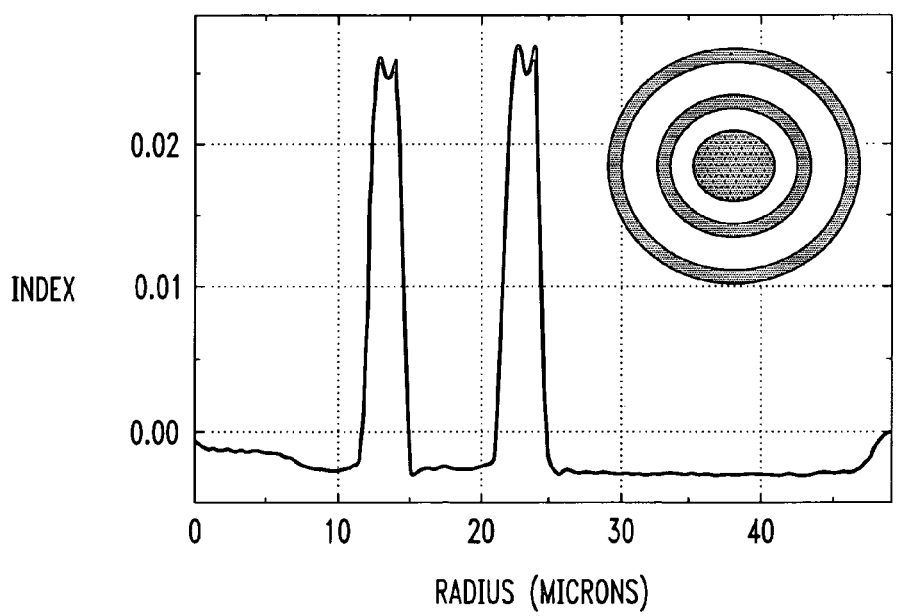
FIG. 5 is a plot associated with the fiber of FIG. 1(a), illustrating the measured values for the refractive indices as a function of radius.
Figure 6:
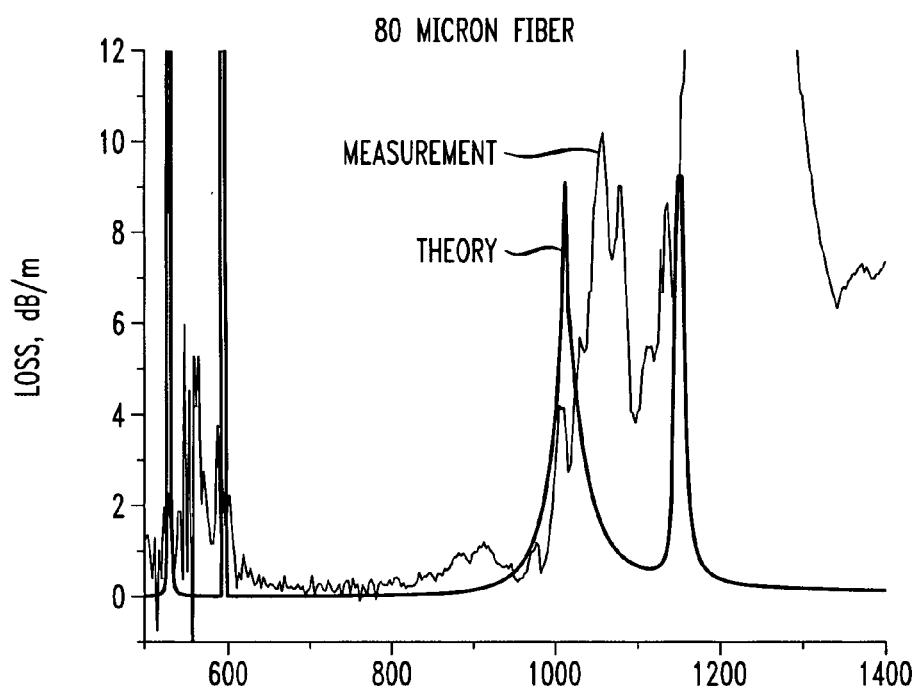
FIG. 6 is a plot of loss as a function of wavelength for the optical fiber filter associated with FIG. 5, illustrating high losses near the predicted index-matching points, providing the optical filtering operation in accordance with the present invention.

FIG. 5 illustrates the fiber index profile for an optical fiber filter 50 of the type illustrated in FIG. 1(a), in this case showing the measured refractive index values for an actual fiber filter. As shown, the measured values match very well to the simulated values, which are only slightly shifted from the design values. FIG. 6 contains a plot of actual results from an optical fiber filter formed in accordance with the present invention. By design of this particular arrangement, index matching was calculated to occur near 600 nm and 1100 nm. Referring to the loss plot, there are obvious loss peaks in the spectrum in both of these areas, on the order of at least 3 dB. A theoretical estimate is included in the plot for the sake of comparison. Thus, it is shown that by including raised-index features in the cladding portion of an optical fiber a significant degree of optical filtering can be obtained. In this particular example, the fiber was bent to achieve the desired loss spectrum. As mentioned above, the loss characteristics of the filter fiber can be improved (or modified) by including bends, twists, gratings, additional materials, etc. in the filter.

Figure 7:
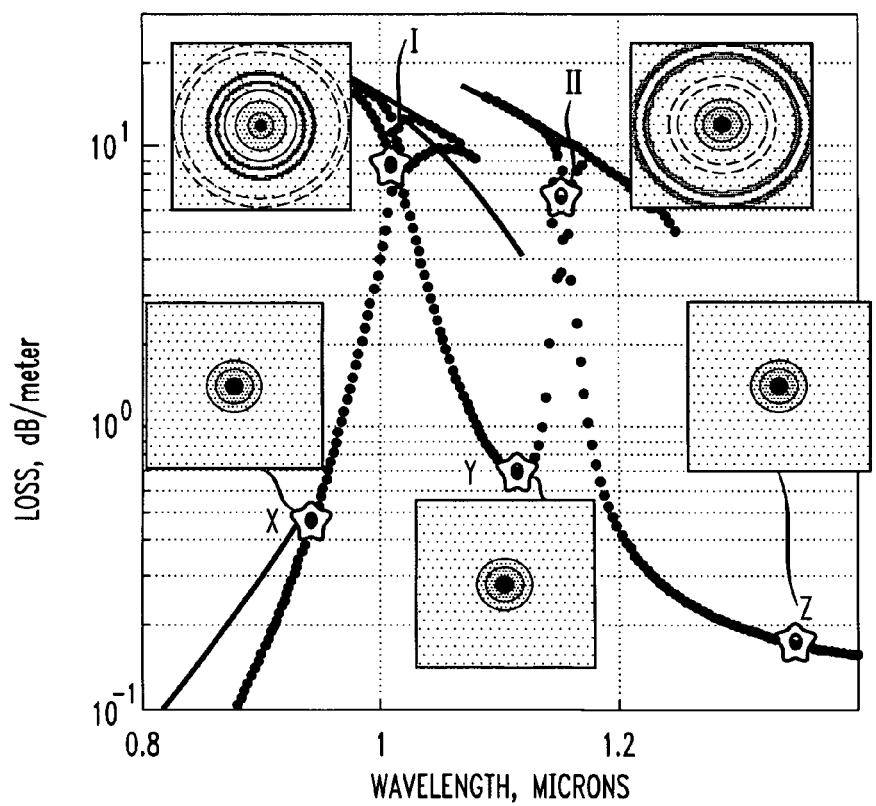
FIG. 7 shows simulated losses and optical intensity plots for the optical fiber filter of FIG. 5.

FIG. 7 contains graphs of signal loss, as a function of wavelength, for the exemplary optical fiber filter arrangement associated with FIG. 5. Various insets within FIG. 7 illustrate intensity plots at various locations along these curves. Indeed, the three intensity plots corresponding to low-loss wavelengths (i.e., the "desired" wavelengths) at points X, Y and Z, illustrate the light intensity as being well-confined within the core region. In contrast, the intensity plots corresponding to high-loss wavelengths (points I and II) show substantial light mixing between the core and the cladding regions. Thus, for the wavelengths associated with points I and II optical filtering will occur, in accordance with the present invention.

It is to be understood that the above-described embodiments are illustrative of only a few of the many possible specific embodiments which can represent applications of the principles of the invention. Numerous and varied other arrangements can be devised by those skilled in the art without departing from the spirit and scope of the invention.

What is claimed is:

1. An optical fiber filter for removing light of at least one predetermined noise wavelength from a fiber core, the fiber filter comprising a length of optical fiber comprising a core region having a first refractive index value denoted $n_{core}$;

a cladding region surrounding the core region, said cladding region having a second refractive index value denoted $n_{clad}$, where $n_{clad} < n_{core}$; and a plurality of high refractive index cladding features disposed within the cladding region having a third refractive index value denoted $n_{hi}$, where $n_{hi} > n_{clad}$, where the value of $n_{hi}$ and the physical properties of the plurality of high refractive index cladding features are selected such that the at least one predetermined noise wavelength is coupled from the core region to the cladding region while maintaining at least one optical signal propagating along the core region, where a coupling length between the core region and a nearest high index cladding feature of said plurality of high refractive index cladding features, and a coupling length between adjacent high index cladding features is essentially the same.

2. An optical fiber filter as defined in claim 1 wherein the plurality of high index cladding features comprises at least one high index ring disposed to surround the core region.

3. An optical fiber filter as defined in claim 2 wherein the at least one high index ring comprises a plurality of concentric rings disposed to surround the core region.

4. An optical fiber filter as defined in claim 1 wherein the length of optical fiber comprises a microstructured fiber including a plurality of cylindrical openings disposed along the cladding region.

5. An optical fiber filter as defined in claim 4 wherein the plurality of high index cladding features comprises at least one cylindrical opening filled with a raised index material.

6. An optical fiber filter as defined in claim 5 wherein the plurality of high index cladding features comprises a plurality of cylindrical openings filled with a raised index material.

7. An optical fiber filter as defined in claim 1 wherein the filter characteristics are modified by introducing mechanical deformation to the fiber.

8. An optical fiber filter as defined in claim 7 wherein the mechanical deformations are selected from the group consisting of macrobends, microbends, twists and gratings.

9. An optical fiber filter as defined in claim 1 wherein the filter further comprises absorptive/scattering material in the cladding region to modify the filter characteristics.

10. An optical fiber filter as defined in claim 1 wherein the loss at the at least one predetermined noise wavelength is at least a factor of five greater than the loss associated with the at least one propagating optical signal.

11. An optical fiber filter as defined in claim 10 where the at least one predetermined noise wavelength and the at least one propagating optical signal wavelength differ by no more than 20%.

12. An optical fiber filter as defined in claim 1 wherein the filter characteristics are determined so as to couple a predetermined noise wavelength while allowing at least one optical signal wavelength shorter than the noise wavelength and at least one optical signal wavelength longer than the noise wavelength to remain propagating along the core region.

13. An optical fiber filter as defined in claim 1 wherein the filter exhibits chromatic dispersion at wavelengths where the effective index values of the core and cladding modes are substantially matched.

* * * * *